US012588077B2

(12) United States Patent
Zhang

(10) Patent No.: US 12,588,077 B2
(45) Date of Patent: Mar. 24, 2026

(54) METHOD AND DEVICE IN COMMUNICATION NODE FOR WIRELESS COMMUNICATION

(71) Applicant: APOGEE NETWORKS, LLC, Plano, TX (US)

(72) Inventor: Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 0 days.

(21) Appl. No.: 18/731,372

(22) Filed: Jun. 3, 2024

(65) Prior Publication Data

US 2024/0324028 A1     Sep. 26, 2024

Related U.S. Application Data

(63) Continuation of application No. 17/358,027, filed on Jun. 25, 2021, now Pat. No. 12,041,668, which is a
(Continued)

(30) Foreign Application Priority Data

Jan. 19, 2020     (CN) .......................... 202010060757.5

(51) Int. Cl.
$H04W\ 72/04$          (2023.01)
$H04W\ 24/10$          (2009.01)
(Continued)

(52) U.S. Cl.
CPC ....... H04W 74/0841 (2013.01); H04W 24/10 (2013.01); H04W 72/02 (2013.01);
(Continued)

(58) Field of Classification Search
CPC ..... H04B 7/185; H04B 7/1851; H04L 5/0053; H04W 74/0841; H04W 24/10;
(Continued)

(56) References Cited

U.S. PATENT DOCUMENTS 11,818,771 B2 * 11/2023 Ohara .................... H04W 52/36
2016/0255591 A1 * 9/2016 Park ........................ H04W 4/70
                                                        455/522
(Continued)

FOREIGN PATENT DOCUMENTS

CN          109479327 A       3/2019
EP            3457770 A1 *   3/2019    .............. H04W 4/70
(Continued)

OTHER PUBLICATIONS

ISR in application PCT/CN2021/071044 dated Apr. 14, 2021.
(Continued)

*Primary Examiner* — Lan-Huong Truong
(74) *Attorney, Agent, or Firm* — Volpe Koenig

(57)          ABSTRACT

The disclosure provides method and device in communication node for wireless communication. The communication node receives a first signaling and a first signal, and transmits a second signal; wherein the first signaling is used for determining a first offset; the first signal is used for determining a first measurement result; the second signal includes N second sub-signal(s), a first sequence is used for determining the N second sub-signal(s). In view of the problems that the method to determine repetitions of a preamble sequence is not applicable to a large-latency network and that multiple attempts of random access in a large-latency network will cause a larger latency, the disclosure provides an offset based scheme, in which the communication node introduces the first offset when determining the repetitions of a preamble sequence, thereby selecting an more appropriate number of repetitions, improving the successful probability of random access and reducing latency.

20 Claims, 4 Drawing Sheets

Related U.S. Application Data continuation of application No. PCT/CN2021/071044, filed on Jan. 11, 2021.

(51) Int. Cl.

| | |
|---|---|
| *H04W 72/02* | (2009.01) |
| *H04W 72/0446* | (2023.01) |
| *H04W 72/0453* | (2023.01) |
| *H04W 74/00* | (2009.01) |
| *H04W 74/0833* | (2024.01) |
| *H04W 74/0836* | (2024.01) |
| *H04W 84/06* | (2009.01) |

(52) U.S. Cl.
CPC ... *H04W 72/0446* (2013.01); *H04W 72/0453* (2013.01); *H04W 74/002* (2013.01); *H04W 74/0833* (2013.01); *H04W 74/0836* (2024.01); *H04W 84/06* (2013.01)

(58) Field of Classification Search
CPC ............. H04W 72/02; H04W 72/0446; H04W 72/0453; H04W 74/008; H04W 84/06; H04W 74/006; H04W 56/00; H04W 74/0833; H04W 74/004
See application file for complete search history.

(56) References Cited

U.S. PATENT DOCUMENTS

| | | |
|---|---|---|
| 2018/0092129 A1 | 3/2018 | Guo et al. |
| 2018/0176958 A1 | 6/2018 | Islam et al. |
| 2018/0270869 A1 | 9/2018 | Tsai |
| 2019/0159175 A1 | 5/2019 | Islam |

FOREIGN PATENT DOCUMENTS

| | | | |
|---|---|---|---|
| WO | 2015116732 A1 | 8/2015 | |
| WO | 2017023066 A1 | 2/2017 | |
| WO | WO-2018129357 A1 * | 7/2018 | ........... H04B 17/336 |
| WO | 2019098906 A1 | 5/2019 | |
| WO | WO-2019161044 A1 * | 8/2019 | ......... H04B 7/18504 |
| WO | 2019191753 A1 | 10/2019 | |

OTHER PUBLICATIONS

First Office Action of Chinses patent application No. CN202010060757.5 dated Mar. 25, 2022.
Second Office Action of Chinses patent application No. CN202010060757.5 dated Sep. 19, 2022.
First Search Report of Chinses patent application No. CN202010060757.5 dated Mar. 21, 2022.
Panasonic Timing advance and RACH for NTN 3GPP TSG RAN WG1 #98bis R1-1911004 Oct. 5, 2019.
Samsung Uplink timing advance/RACH procedure and Synchronization for NTN 3GPP TSG RAN WG1 Meeting #96bis R1-1904438 Mar. 28, 2019.
Notification to Grant Patent Right for Invention of Chinese patent application No. CN202010060757.5 dated Jul. 27, 2023.
First Office Action received in application No. EP21700103.1 dated Jul. 3, 2023.
Huawei et al., "On coverage enhancement determination during random access procedure," 3GPP TSG RAN WG1 Meeting #82bis, R1-155116, Malmo, Sweden (Oct. 9-15, 2015).
Thales et al., "Study on NR to support Non-Terrestrial Networks," 3GPP TSG RAN WG1 Meeting 88bis, RP-171450, West Palm Beach, USA (Jun. 5-9, 2017).
Third Generation Partnership Project, "Technical Specification Group Radio Access Network; NR; Multiplexing and channel coding (Release 16)," 3GPP TS 38.212 V16.0.0 (Dec. 2019).
Third Generation Partnership Project, "Technical Specification Group Radio Access Network; NR; Physical layer procedures for data (Release 16)," 3GPP TS 38.214 V16.0.0 (Dec. 2019).
Third Generation Partnership Project, "Technical Specification Group Radio Access Network; NR; Medium Access Control (MAC) protocol specification (Release 15)," 3GPP TS 38.321 V15.8.0 (Dec. 2019).
Third Generation Partnership Project, "Technical Specification Group Radio Access Network NR Radio Resource Control (RRC) protocol specification (Release 15)," 3GPP TS 38.331 V15.8.0 (Dec. 2019).

* cited by examiner

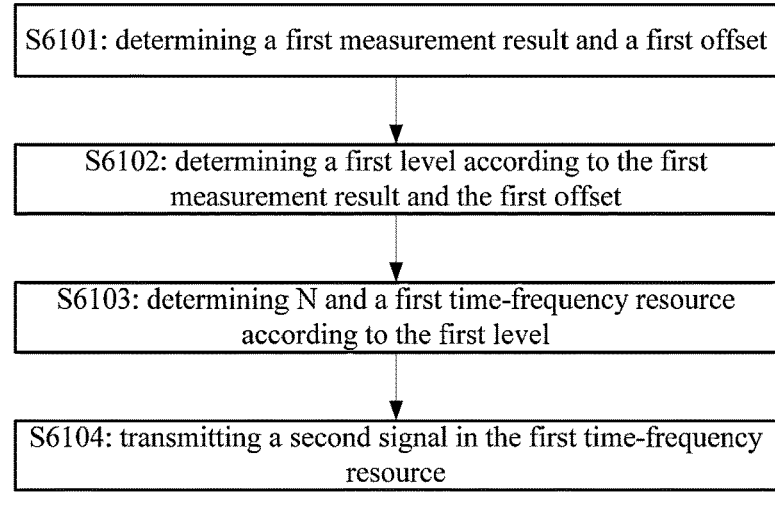

S6101: determining a first measurement result and a first offset

S6102: determining a first level according to the first measurement result and the first offset S6103: determining N and a first time-frequency resource according to the first level S6104: transmitting a second signal in the first time-frequency resource

FIG. 6

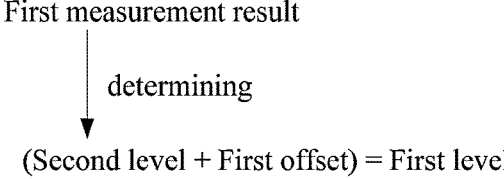

(First measurement result + First offset) —used for determining→ First level

FIG. 7

First measurement result

| determining (Second level + First offset) = First level

FIG. 8

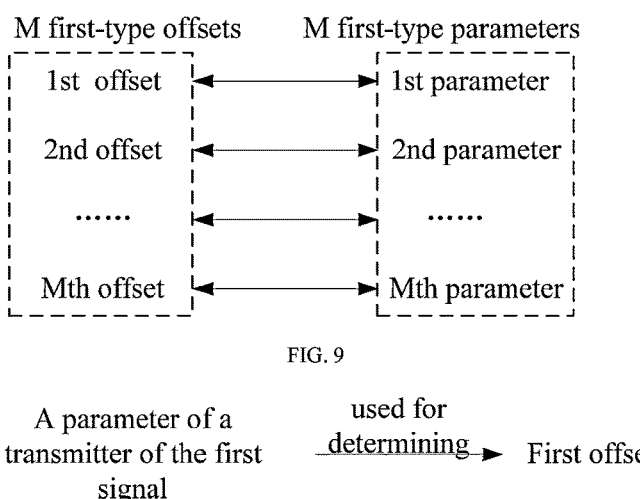

M first-type offsets　　　M first-type parameters

1st offset　←→　1st parameter

2nd offset　←→　2nd parameter

……　←→　……

Mth offset　←→　Mth parameter

FIG. 9

A parameter of a transmitter of the first signal —used for determining→ First offset

FIG. 10

A relationship between a first node and a transmitter of the first signal → used for determining → First offset
FIG. 11
Number of first transmission times → used for determining → First offset
FIG. 12
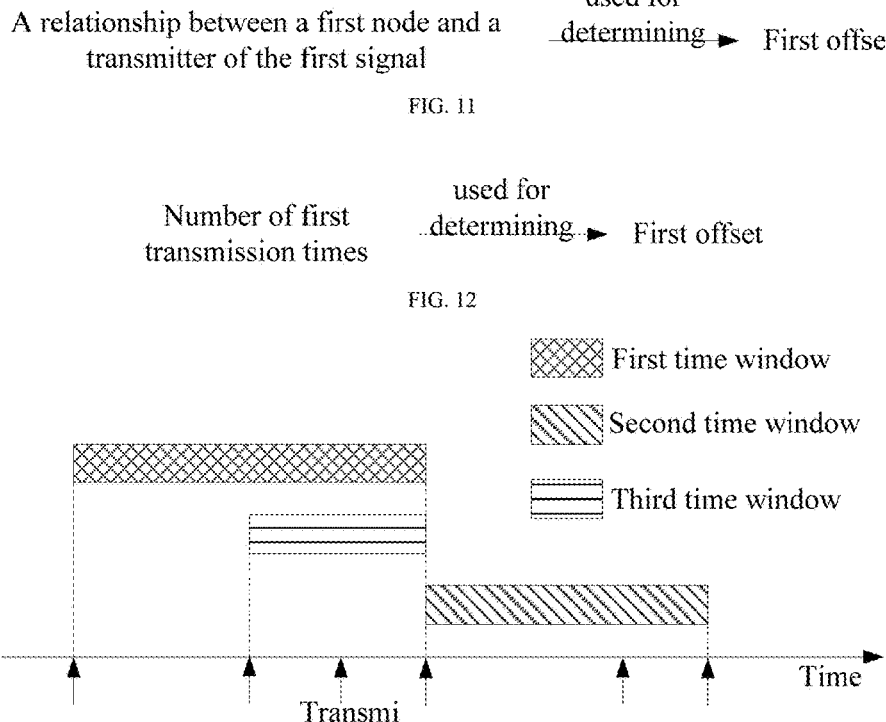
FIG. 13
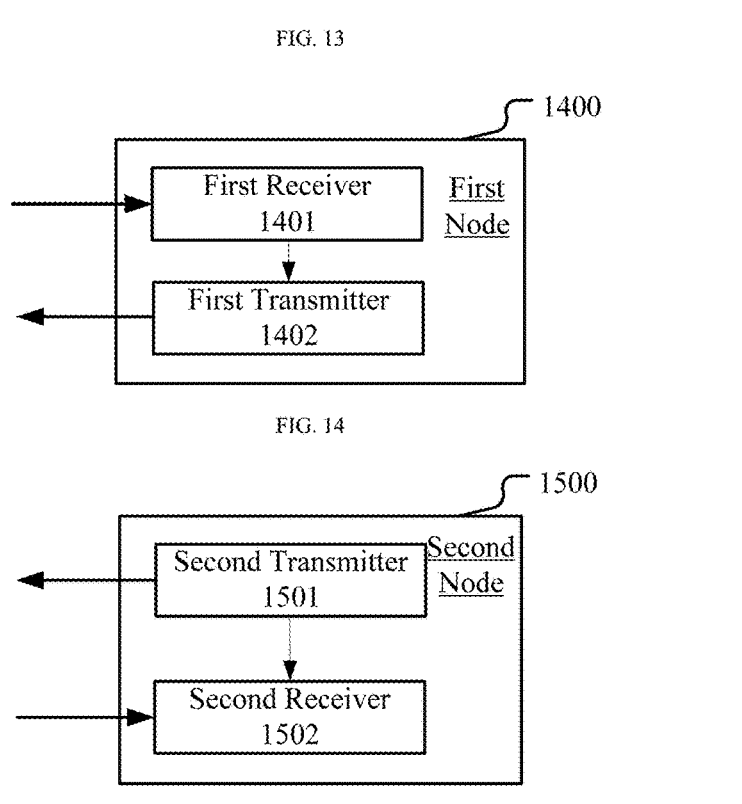
FIG. 14
FIG. 15

METHOD AND DEVICE IN COMMUNICATION NODE FOR WIRELESS COMMUNICATION

CROSS REFERENCE TO RELATED APPLICATIONS

This application is a continuation of the U.S. patent application Ser. No. 17/358,027, filed on Jun. 25, 2021, which is a continuation of International Application No. PCT/CN2021/071044, filed Jan. 11, 2021, claims the priority benefit of Chinese Patent Application No. 202010060757.5, filed on Jan. 19, 2020, the full disclosure of which is incorporated herein by reference.

BACKGROUND

Technical Field

The disclosure relates to transmission methods and devices in wireless communication systems, and in particular to a transmission method and device for large latency.

Related Art

Facing higher and higher communication demands, 3rd Generation Partner Project (3GPP) begins to study Non-Terrestrial Network (NTN) communications; the 3GPP RAN #8 plenary decides to develop a study item of "Solutions of New Radio (NR) to Support NTN", which is a continuation (RP-171450) of a previous study item of "NR to Support NTN", wherein Random Access (RA) is one important aspect to study.

SUMMARY

In a random access process, a User Equipment (UE) sends a Message 1 (Msg1), and will detect a Message 2 (Msg2) in a preconfigured ra-ResponseWindow; if the UE does not receive an effective response, the UE will transmit a Msg1 again; when a number of times the Msg 1 is transmitted reaches a maximum number of transmission times configured by a network, a random access problem is indicated to occur. In NTN communication, Round Trip Time (TTI) is far greater than that in Terrestrial Network (TN) communication, and the UE experiences a large transmission latency each time the UE attempts to transmit a Msg1, moreover, the more times the attempt to transmit the Msg1, the larger the latency of random access; therefore, it is needed to improve the random access efficiency of the UE in NTN communication. In order to enhance coverage, the Narrow Band-Internet of Things (NB-IoT) allows a Physical Random Access Channel (PRACH) to perform multiple repetitions of transmissions, wherein the number of repetitions is related to an Enhanced Coverage Level (CEL); through multiple repetitions of transmissions of PRACH, the successful probability of random access may be improved. In a TN network, the CEL is related to an RSRP threshold; however, in an NTN network, RSRPs received by a UE are of little difference at the center of the cell and at the edge of the cell; therefore, it might not be accurate to determine the number of PRACH repetitions through determining the CEL according to an RSRP only.

In view of the above problems, the disclosure provides a solution. In the above problem description, the NTN scenario is taken as an example; the disclosure is also applicable to scenarios of, for example, territorial transmission, and can achieve similar technical effects as in NTN scenarios. Furthermore, the adoption of a unified solution by different scenarios helps reduce the complexity and cost of hardware.

It should be noted that embodiments of any node in the disclosure and characteristics in the embodiments may be applied to any other node if no conflict is incurred. The embodiments in the disclosure and characteristics in the embodiments may be mutually combined arbitrarily if no conflict is incurred. The embodiments of the first node in the disclosure and characteristics in the embodiments may be applied to the second node, and vice versa. In particular, explanations for terminologies, glossaries, functions and variables in the disclosure can refer to definitions in standard protocols TS36, TS38 and TS37 in 3GPP (if not specified). The embodiments in the disclosure and characteristics in the embodiments may be mutually combined arbitrarily if no conflict is incurred.

The disclosure provides a method in a first node for wireless communication, wherein the method includes:

receiving a first signaling and a first signal; and transmitting a second signal.

Herein, the first signaling is used for determining a first offset; the first signal is used for determining a first measurement result; the second signal includes N second sub-signal(s), a first sequence is used for determining the N second sub-signal(s); the first measurement result and the first offset are both used for determining the N; the N is a positive integer, and the second signal is used for initiating a random access.

In one embodiment, the problem to be solved by the disclosure includes: the RTT of an NTN is big, and the UE will experience a large latency when performing a random access in the NTN.

In one embodiment, the problem to be solved by the disclosure includes: there might be certain error when the CEL is determined only using an RSRP in an NTN, resulting in an inaccurate selected number of PRACH repetitions.

In one embodiment, the above method is characterized in that: the number of repetitions of the first sequence is determined according to the first measurement result and the first offset.

In one embodiment, the above method is characterized in that: a parameter of the first offset is added in the criteria used to determine the number of repetitions of the first sequence.

In one embodiment, the above method is characterized in that: the first offset is related to a parameter of a base station; the parameter of the base station includes one of the type, height, altitude or coverage of the base station.

In one embodiment, the above method is characterized in that: the first offset is related to a distance between a base station and the UE.

In one embodiment, the above method is characterized in that: the first offset is related to a transmission latency between a base station and the UE.

In one embodiment, the above method is characterized in that: the first offset is related to a Timing Advance (TA).

In one embodiment, the above method has the following benefits: the first offset may compensate for a deviation of RSRP measurement due to NTN.

In one embodiment, the above method has the following benefits: through the introduction of the first offset, the number of PRACH repetitions may be estimated more accurately.

In one embodiment, the above method has the following benefits: through the introduction of the first offset, the successful probability of random access of the user may be improved.

In one embodiment, the above method has the following benefits: on the basis of the original protocol standards, only one offset is added, which does not make an effect on the evolution of the protocol version.

According to one aspect of the disclosure, the first measurement result and the first offset are used for determining a first level, and the first level is associated to the N.

In one embodiment, the above method is characterized in that: the first level is determined according to a summation of the first measurement result and the first offset.

In one embodiment, the above method is characterized in that: the first offset is added in a judgement threshold of the first level.

In one embodiment, the above method is characterized in that: a second level is determined according to the first measurement result; and the first level is determined according to a summation of the second level and the first offset.

In one embodiment, the above method is characterized in that: the first level is determined first, and the number of repetitions of the first sequence is determined through the first level.

According to one aspect of the disclosure, the method includes:

receiving a second signaling.

Herein, the second signaling includes a first time-frequency resource set; the first measurement result and the first offset are used for selecting a first time-frequency resource from the first time-frequency resource set; and the second signal is associated to the first time-frequency resource.

In one embodiment, the above method is characterized in that: different numbers of repetitions of the first sequence correspond to different time-frequency resource positions and time-frequency resource sizes.

According to one aspect of the disclosure, the method includes:

receiving a third signaling.

Herein, the third signaling is used for determining M first-type offsets; the first offset is one of the M first-type offsets; a first parameter is used for selecting the first offset from the M first-type offsets; and the first parameter is related to a parameter of a transmitter of the first signal.

In one embodiment, the above method is characterized in that: a base station configures multiple offsets for a UE, and the UE determines one offset according to the first parameter.

According to one aspect of the disclosure, the first offset is related to a parameter of the transmitter of the first signal.

According to one aspect of the disclosure, the first offset is related to a relationship between the first node and the transmitter of the first signal.

According to one aspect of the disclosure, the first offset is related to a number of first transmission times; a number of transmission times of the second signal is used for determining the number of first transmission times.

According to one aspect of the disclosure, the method includes:

starting a first timer at a first time; and receiving a third signal in a second time window.

Herein, the first timer is used for determining a first time window; the first node does not monitor a candidate signaling in the first time window; the first time is used for determining a start of the first time window; the first time is related to a transmitting time of the second signal; a parameter of the transmitter of the first signal is used for determining a length of the first time window; a start of the second time window is an end of the first time window; and a length of the second time window is related to the N.

According to one aspect of the disclosure, after the UE transmits the second signal, the UE starts the first timer, and performs DRX to enter an Inactive state during the running period of the first timer.

According to one aspect of the disclosure, the method has the following benefits: during the running period of the first timer, the UE does not need to monitor a Physical Downlink Control Channel (PDCCH), thereby saving power.

The disclosure provides a method in a second node for wireless communication, wherein the method includes:

transmitting a first signaling and a first signal; and receiving a second signal.

Herein, the first signaling is used for determining a first offset; the first signal is used for determining a first measurement result; the second signal includes N second sub-signal(s), a first sequence is used for determining the N second sub-signal(s); the first measurement result and the first offset are both used for determining the N; the N is a positive integer, and the second signal is used for initiating a random access.

According to one aspect of the disclosure, the first measurement result and the first offset are used for determining a first level, and the first level is associated to the N.

According to one aspect of the disclosure, the method includes:

transmitting a second signaling.

Herein, the second signaling includes a first time-frequency resource set; the first measurement result and the first offset are used for selecting a first time-frequency resource from the first time-frequency resource set; and the second signal is associated to the first time-frequency resource.

According to one aspect of the disclosure, the method includes:

transmitting a third signaling.

Herein, the third signaling is used for determining M first-type offsets; the first offset is one of the M first-type offsets; a first parameter is used for selecting the first offset from the M first-type offsets; and the first parameter is related to a parameter of a transmitter of the first signal.

According to one aspect of the disclosure, the first offset is related to a parameter of the second node.

According to one aspect of the disclosure, the first offset is related to a relationship between a receiver of the first signal and the second node.

According to one aspect of the disclosure, the first offset is related to a number of first transmission times; a number of transmission times of the second signal is used for determining the number of first transmission times.

According to one aspect of the disclosure, the method includes:

a first timer being started at a first time; and transmitting a third signal in a second time window.

Herein, the first timer is used for determining a first time window; a receiver of the first signal does not monitor a candidate signaling in the first time window; the first time is used for determining a start of the first time window; the first time is related to a transmitting time of the second signal; a parameter of the second node is used for determining a length of the first time window; a start of the second time window is an end of the first time window; and a length of the second time window is related to the N.

The disclosure provides a first node for wireless communication, wherein the first node includes:

a first receiver, to receive a first signaling and a first signal; and a first transmitter, to transmit a second signal.

Herein, the first signaling is used for determining a first offset; the first signal is used for determining a first measurement result; the second signal includes N second sub-signal(s), a first sequence is used for determining the N second sub-signal(s); the first measurement result and the first offset are both used for determining the N; the N is a positive integer, and the second signal is used for initiating a random access.

The disclosure provides a second node for wireless communication, wherein the second node includes:

a second transmitter, to transmit a first signaling and a first signal; and a second receiver, to receive a second signal.

Herein, the first signaling is used for determining a first offset; the first signal is used for determining a first measurement result; the second signal includes N second sub-signal(s), a first sequence is used for determining the N second sub-signal(s); the first measurement result and the first offset are both used for determining the N; the N is a positive integer, and the second signal is used for initiating a random access.

In one embodiment, compared with conventional schemes, the disclosure has the following advantages.

An NTN is characterized by large latency. A UE will experience a larger latency due to multiple attempts to transmit a preamble sequence when performing a random access in an NTN.

The multiple repetitions of transmissions of the preamble sequence may improve the successful probability of random access. By introducing a first offset, the criteria used to determine the repetitions of the preamble sequence may be compatible to an NTN system, such that the UE can select a more accurate number of repetitions, thereby improving the probability of random access, and avoiding attempting more random accesses to lead to a larger latency.

BRIEF DESCRIPTION OF THE DRAWINGS

Other features, purposes and advantages of the disclosure will become more apparent from the detailed description of non-restrictive embodiments taken in conjunction with the following drawings.

FIG. 6 is a diagram illustrating a scenario in which a first node determines a number of repetitions of a second signal and transmission resources according to one embodiment of the disclosure.

FIG. 7 is a diagram illustrating a scenario in which a first measurement result and a first offset are used for determining a first level according to one embodiment of the disclosure.

FIG. 8 is a diagram illustrating a scenario in which a first measurement result and a first offset are used for determining a first level according to another embodiment of the disclosure.

FIG. 9 is a diagram illustrating a scenario in which M first-type offsets are associated to M first-type parameters according to one embodiment of the disclosure.

FIG. 10 is a diagram illustrating a scenario in which a parameter of a second node is used for determining a first offset according to one embodiment of the disclosure.

FIG. 11 is a diagram illustrating a scenario in which a relationship between a first node and a second node is used for determining a first offset according to one embodiment of the disclosure.

FIG. 12 is a diagram illustrating a scenario in which a number of first transmission times is used for determining a first offset according to one embodiment of the disclosure.

FIG. 13 is a diagram illustrating a timing sequence relationship of a first timer according to one embodiment of the disclosure.

FIG. 14 is a structure block diagram illustrating a processing device in a first node according to one embodiment of the disclosure.

FIG. 15 is a structure block diagram illustrating a processing device in a second node according to one embodiment of the disclosure.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
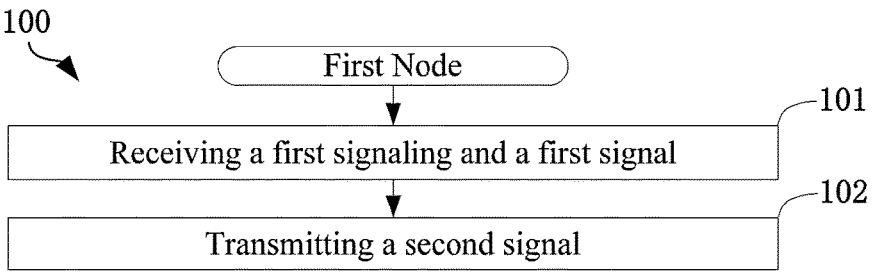
FIG. 1 is a flowchart of transmission of a first signaling, a first signal and a second signal according to one embodiment of the disclosure.

Embodiment 1 illustrates a flowchart of transmission of a first signaling, a first signal and a second signal according to one embodiment of the disclosure, as shown in FIG. 1. In FIG. 1, each box represents one step; in particular, it should be noted that the order of the boxes does not represent a time precedence of the steps represented by the boxes.

In Embodiment 1, the first node in the disclosure receives the first signaling and the first signal in S101, and transmits the second signal in S102; wherein the first signaling is used for determining a first offset; the first signal is used for determining a first measurement result; the second signal includes N second sub-signal(s), a first sequence is used for determining the N second sub-signal(s); the first measurement result and the first offset are both used for determining the N; the N is a positive integer, and the second signal is used for initiating a random access.

In one embodiment, the first signaling is transmitted through an air interface.

In one embodiment, the first signaling is transmitted through a radio interface.

In one embodiment, the first signaling is transmitted through a higher layer signaling.

In one embodiment, the first signaling includes partial or an entirety of a higher layer signaling.

In one embodiment, the first signaling includes one Radio Resource Control (RRC) message.

In one embodiment, the first signaling includes partial or all Information Elements (IEs) in one RRC signaling.

In one embodiment, the first signaling includes partial or all fields in one IE in one RRC signaling.

In one embodiment, the first signal is transmitted through an antenna port.

In one embodiment, the first signal is transmitted through an air interface

In one embodiment, the first signal is transmitted through a broadcast channel.

In one embodiment, the first signal is transmitted through a Physical Broadcast Channel (PBCH).

In one embodiment, the first signal includes one radio signal.

In one embodiment, the first signal includes one baseband signal.

In one embodiment, the first signal includes one physical layer signal.

In one embodiment, the first signal includes one Reference Signal (RS).

In one embodiment, the first signal includes a Primary Synchronization Signal (PSS).

In one embodiment, the first signal includes a Secondary Synchronization Signal (SSS).

In one embodiment, the first signal includes a cell-specific reference signal (CRS).

In one embodiment, the first signal includes a Channel-State Information Reference Signal (CSI-RS).

In one embodiment, the first signal includes a synchronization signal and pbch block (SSB).

In one embodiment, the second signal includes one radio signal.

In one embodiment, the second signal includes one air interface signal.

In one embodiment, the second signal includes one baseband signal.

In one embodiment, the second signal includes a Radio Frequency (RF) signal.

In one embodiment, the second signal includes a physical layer signal.

In one embodiment, the second signal includes a random access signal.

In one embodiment, the second signal includes a Msg1 in 4-step RACH.

In one embodiment, the second signal includes a MsgA in 2-step RACH.

In one embodiment, the second signal includes N repetitions of a preamble.

In one embodiment, the second signal includes N repetitions of the first sequence.

In one embodiment, the second signal includes N repetitions of a PRACH.

In one embodiment, the second signal includes a payload.

In one embodiment, the first sequence includes a preamble sequence.

In one embodiment, the first sequence includes a preamble.

In one embodiment, the first sequence includes a Physical Random Access Channel (PRACH).

In one embodiment, the first sequence includes a Narrowband Physical Random Access Channel (NPRACH).

In one embodiment, the first offset includes one offset for a CEL.

In one embodiment, the first offset includes one offset for the first measurement result.

In one embodiment, the first offset includes one offset for a judgement threshold of a CEL.

In one embodiment, the first offset includes one offset for the number of repetitions.

In one embodiment, the first offset has a same unit as the first measurement result.

In one embodiment, the measurement result includes a Reference Signal Received Power (RSRP).

In one embodiment, the measurement result includes a Reference Signal Received Quality (RSRQ).

In one embodiment, the measurement result includes a Received Signal Strength Indicator (RSSI).

In one embodiment, the measurement result includes a Signal to Noise and Interference Ratio (SINR).

In one embodiment, the measurement result includes a Channel Status Information reference signal resource indicator (CRI).

In one embodiment, the N is configurable.

In one embodiment, the N is preconfigured.

In one embodiment, the N is of a fixed size.

In one embodiment, the N is equal to 1.

In one embodiment, the N is greater than 1.

In one embodiment, when the N is equal to 1, the second signal includes one first sequence only.

In one embodiment, when the N is equal to 1, the second signal includes one preamble only.

In one embodiment, when the N is greater than 1, the second signal includes N repetitions of a preamble.

In one embodiment, the phrase that the second signal includes N second sub-signal(s) and a first sequence is used for generating the N second sub-signal(s) includes the following meaning: the second signal includes N repetitions of the first sequence.

In one embodiment, the phrase that the second signal includes N second sub-signal(s) and a first sequence is used for generating the N second sub-signal(s) includes the following meaning: the N second sub-signal(s) include N repetitions of the first sequence.

In one embodiment, the phrase that the second signal includes N second sub-signal(s) and a first sequence is used for generating the N second sub-signal(s) includes the following meaning:

the second signal includes the N second sub-signals.

In one embodiment, the phrase that the second signal includes N second sub-signal(s) and a first sequence is used for generating the N second sub-signal(s) includes the following meaning: the second signal includes N duplicates of the first sequence.

In one embodiment, the N is numRepetitionPerPreambleAttempt in TS36 protocols, and the numRepetitionPerPreambleAttempt is used for determining a number of PRACH repetitions corresponding to each CEL.

In one embodiment, the N second sub-signals are one signal.

In one embodiment, the N second sub-signals are N separate signals.

In one embodiment, any two of the N second sub-signals occupy orthogonal frequency domain resources.

In one embodiment, any two of the N second sub-signals are transmitted at the same time.

In one embodiment, any two of the N second sub-signals are transmitted at different times.

In one embodiment, any two of the N second sub-signals are transmitted at the same time. In one embodiment, any one of the N second sub-signals is the same as the first sequence.

In one embodiment, all of the N second sub-signals are transmitted at a first time interval.

In one subembodiment, the first time interval includes a period of time.

In one subembodiment, the first time interval is in unit of slot.

In one subembodiment, the first time interval is in unit of millisecond (ms).

In one subembodiment, the first time interval is in unit of second (s).

In one subembodiment, the first time interval is precon-figured.

In one subembodiment, the first time interval is config-urable.

In one subembodiment, the first time interval is of a fixed size.

In one subembodiment, the first time interval is not equal to 0.

In one embodiment, the N is not greater than a maximum number of allowed attempts of the second signal.

In one embodiment, the N second sub-signals are trans-mitted before the start of the second time window.

In one embodiment, the phrase that the first measurement result and the first offset are both used for determining the N includes the following meaning: the first measurement result and the first offset are used for determining a first level, and the first level is used for determining the N.

In one subembodiment, a summation of the first measure-ment result and the first offset is used for determining a first level, and the first level is used for determining the N.

In one embodiment, the phrase that the first measurement result and the first offset are both used for determining the N includes the following meaning: the first measurement result is used for determining a second level, the second level and the first offset are used for determining the N.

In one subembodiment, the first measurement result is used for determining a second level, and a summation of the second level and the first offset is used for determining the N.

In one embodiment, the phrase that the first measurement result and the first offset are both used for determining the N includes the following meaning: the first measurement result is used for determining M; the M and the first offset are used for determining the N; and the M is a number of repetitions of the first sequence.

In one subembodiment, the first measurement result is used for determining the M, and a summation of the M and the first offset is used for determining the N.

In one embodiment, the phrase that the first measurement result and the first offset are both used for determining the N includes the following meaning: a summation of the first measurement result and the first offset is used for determin-ing the N.

In one embodiment, the phrase that the second signal is used for initiating a random access includes the following meaning: the second signal is used for initiating a 4-step RACH.

In one embodiment, the phrase that the second signal is used for initiating a random access includes the following meaning: the second signal is used for initiating a 2-step RACH.

In one embodiment, the phrase that the second signal is used for initiating a random access includes the following meaning: the second signal is used for initiating a Type-1 RACH.

In one embodiment, the phrase that the second signal is used for initiating a random access includes the following meaning: the second signal is used for initiating a Type-2 RACH.

Embodiment 2

Figure 2:
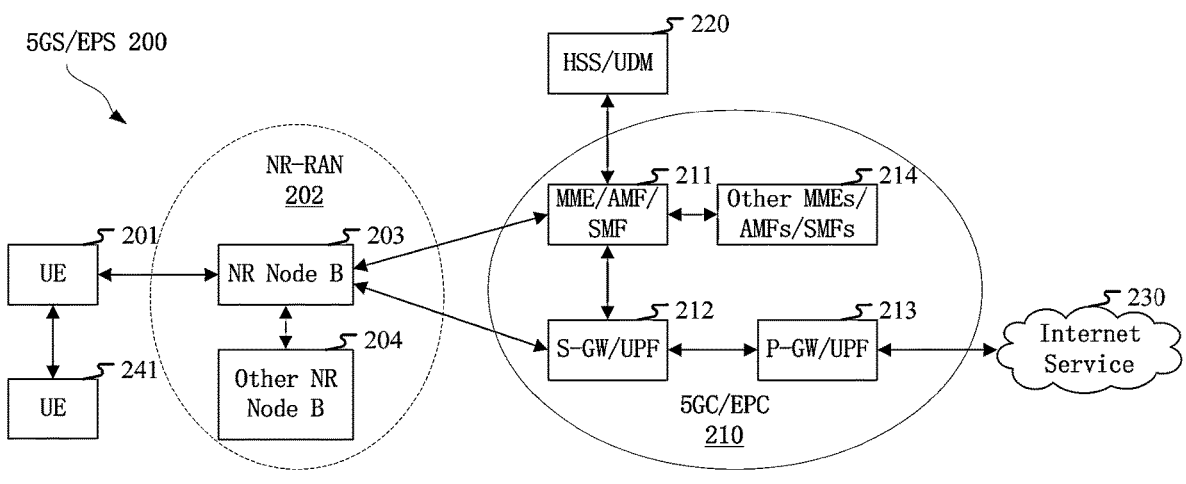
FIG. 2 is a diagram illustrating a network architecture according to one embodiment of the disclosure.

Embodiment 2 illustrates a diagram of a network archi-tecture according to the disclosure, as shown in FIG. 2. FIG. 2 is a diagram illustrating a network architecture 200 of 5G NR, Long-Term Evolution (LTE), Long-Term Evolution Advanced (LTE-A) systems. The 5G NR or LTE network architecture 200 may be called a 5G System (5GS)/Evolved Packet System (EPS) 200 or some other appropriate terms. The 5GS/EPS 200 may include one or more UEs 201, an NG-RAN 202, a 5G Core Network/Evolved Packet Core (5GC/EPC) 210, a Home Subscriber Server/Unified Data Management (HSS/UDM) 220 and an Internet Service 230. The 5GS/EPS may be interconnected with other access networks. For simple description, the entities/interfaces are not shown. As shown in FIG. 2, the 5GS/EPS provides packet switching services. Those skilled in the art are easy to understand that various concepts presented throughout the present disclosure may be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may also be called a base station, a base transceiver station, a radio base station, a radio transceiver, a transceiver function, a Basic Service Set (BSS), an Extended Service Set (ESS), a Transmitter Receiver Point (TRP) or some other appropriate terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistants (PDAs), Satellite Radios, non-terrestrial base station com-munications, satellite mobile communications, Global Posi-tioning Systems (GPSs), multimedia devices, video devices, digital audio player (for example, MP3 players), cameras, games consoles, unmanned air-interface vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 includes a Mobility Management Entity/ Authentication Management Field/Session Management Function (MME/AMF/SMF) 211, other MMEs/AMFs/ SMFs 214, a Service Gateway/User Plane Function (S-GW/ UPF) 212 and a Packet Data Network Gateway/UPF (P-GW/UPF) 213. The MME/AMF/SMF 211 is a control node for processing a signaling between the UE 201 and the 5GC/EPC 210. Generally, the MME/AMF/SMF 211 pro-vides bearer and connection management. All user Internet Protocol (IP) packets are transmitted through the S-GW/ UPF 212. The S-GW/UPF 212 is connected to the P-GW/ UPF 213. The P-GW 213 provides UE IP address allocation and other functions. The P-GW/UPF 213 is connected to the Internet service 230. The Internet service 230 includes IP services corresponding to operators, specifically including Internet, Intranet, IP Multimedia Subsystems (IMSs) and Packet Switching Streaming Services (PSSs).

In one embodiment, the UE 201 corresponds to the first node in the disclosure.

In one embodiment, the UE 201 supports transmission in an NTN.

In one embodiment, the UE 201 supports transmission in a large-latency network.

In one embodiment, the UE 201 supports transmission in a TN.

In one embodiment, the UE 201 is a User Equipment (UE).

In one embodiment, the UE 201 is an end device.

In one embodiment, the UE 201 is a vehicle device.

In one embodiment, the UE 201 is an IoT end device.

In one embodiment, the UE 201 is a Coverage Enhancement (CE) UE.

In one embodiment, the UE 201 is a Bandwidth reduced Low complexity (BL) UE.

In one embodiment, the gNB 203 corresponds to the second node in the disclosure.

In one embodiment, the gNB 203 supports transmission in an NTN.

In one embodiment, the gNB 203 supports transmission in a large-latency network.

In one embodiment, the gNB 203 is a base station.

In one embodiment, the gNB 203 is a satellite device.

In one embodiment, the gNB 203 is a flight platform device.

In one embodiment, the gNB 203 is an Unmanned Aerial Vehicle (UAV).

In one embodiment, the gNB 203 supports transmission in a TN.

In one embodiment, the gNB 203 is a marco cellular base station.

In one embodiment, the gNB 203 is a micro cell base station.

In one embodiment, the gNB 203 is a pico cell base station.

In one embodiment, the gNB 203 is a femtocell.

Embodiment 3

Figure 3:
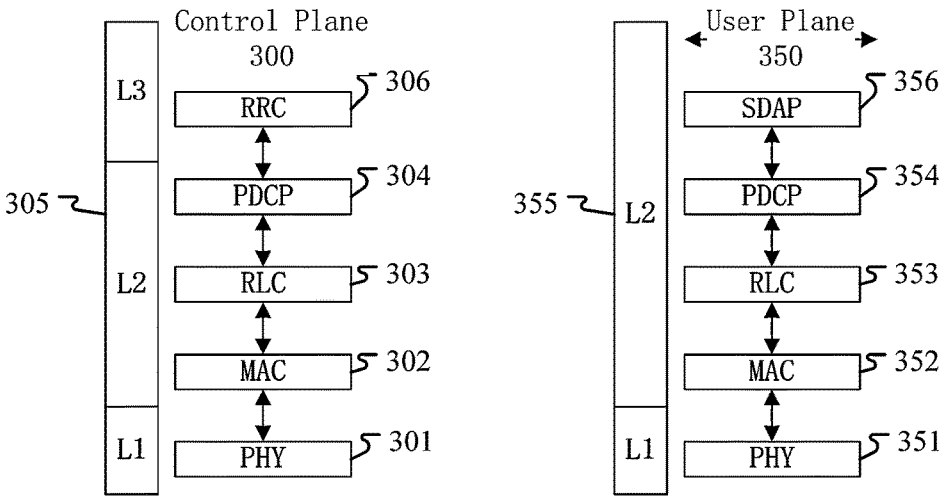
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3. FIG. 3 is a diagram illustrating an embodiment of a radio protocol architecture of a user plane 350 and a control plane 300. In FIG. 3, the radio protocol architecture of a control plane 300 is illustrated by three layers, which are a Layer 1, a Layer 2 and a Layer 3 respectively. The Layer 1 (L1 layer) is the lowest layer and implements various PHY (physical layer) signal processing functions. The L1 layer will be referred to herein as the PHY 301. The Layer 2 (L2 layer) 305 is above the PHY 301, and includes a Medium Access Control (MAC) sublayer 302, a Radio Link Control (RLC) sublayer 303, and a Packet Data Convergence Protocol (PDCP) sublayer 304. The PDCP sublayer 304 provides multiplexing between different radio bearers and logical channels. The PDCP sublayer 304 also provides security by encrypting packets and provides support for handover. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell. The MAC sublayer 302 is also in charge of HARQ operations. The RRC sublayer 306 in the Layer 3 (L3 layer) in the control plane 300 is responsible for acquiring radio resources (i.e. radio bearers) and configuring lower layers using an RRC signaling. The radio protocol architecture of the user plane 350 includes a Layer 1 (L1 layer) and a Layer 2 (L2 layer); the radio protocol architecture in the user plane 350 on the PHY 351, the PDCP sublayer 354 in the L2 Layer 355, the RLC sublayer 353 in the L2 Layer 355 and the MAC sublayer 352 in the L2 Layer 355 is substantially the same as the radio protocol architecture on corresponding layers and sublayers in the control plane 300, with the exception that the PDCP sublayer 354 also provides header compression for higher-layer packets so as to reduce radio transmission overheads. The L2 Layer 355 in the user plane 350 further includes a Service Data Adaptation Protocol (SDAP) sublayer 356; the SDAP sublayer 356 is in charge of mappings between QoS flows and Data Radio Bearers (DRBs), so as to support diversification of services.

In one embodiment, the radio protocol architecture shown in FIG. 3 is applicable to the first node in the disclosure.

In one embodiment, the radio protocol architecture shown in FIG. 3 is applicable to the second node in the disclosure.

In one embodiment, the first signal in the disclosure is generated on the PHY 301 or PHY 351.

In one embodiment, the second signal in the disclosure is generated on the PHY 301 or PHY 351.

In one embodiment, the third signal in the disclosure is generated on the MAC 302 or MAC 352.

In one embodiment, the third signal in the disclosure is generated on the PHY 301 or PHY 351.

In one embodiment, the first signaling in the disclosure is generated on the RRC 306.

In one embodiment, the first signaling in the disclosure is generated on the MAC 302 or MAC 352.

In one embodiment, the first signaling in the disclosure is generated on the PHY 301 or PHY 351.

In one embodiment, the second signaling in the disclosure is generated on the RRC 306.

In one embodiment, the second signaling in the disclosure is generated on the MAC 302 or MAC 352.

In one embodiment, the second signaling in the disclosure is generated on the PHY 301 or PHY 351.

In one embodiment, the third signaling in the disclosure is generated on the RRC 306.

In one embodiment, the third signaling in the disclosure is generated on the MAC 302 or MAC 352.

In one embodiment, the third signaling in the disclosure is generated on the PHY 301 or PHY 351.

In one embodiment, the candidate signaling in the disclosure is generated on the PHY 301 or PHY 351.

Embodiment 4

Figures 4, 5:
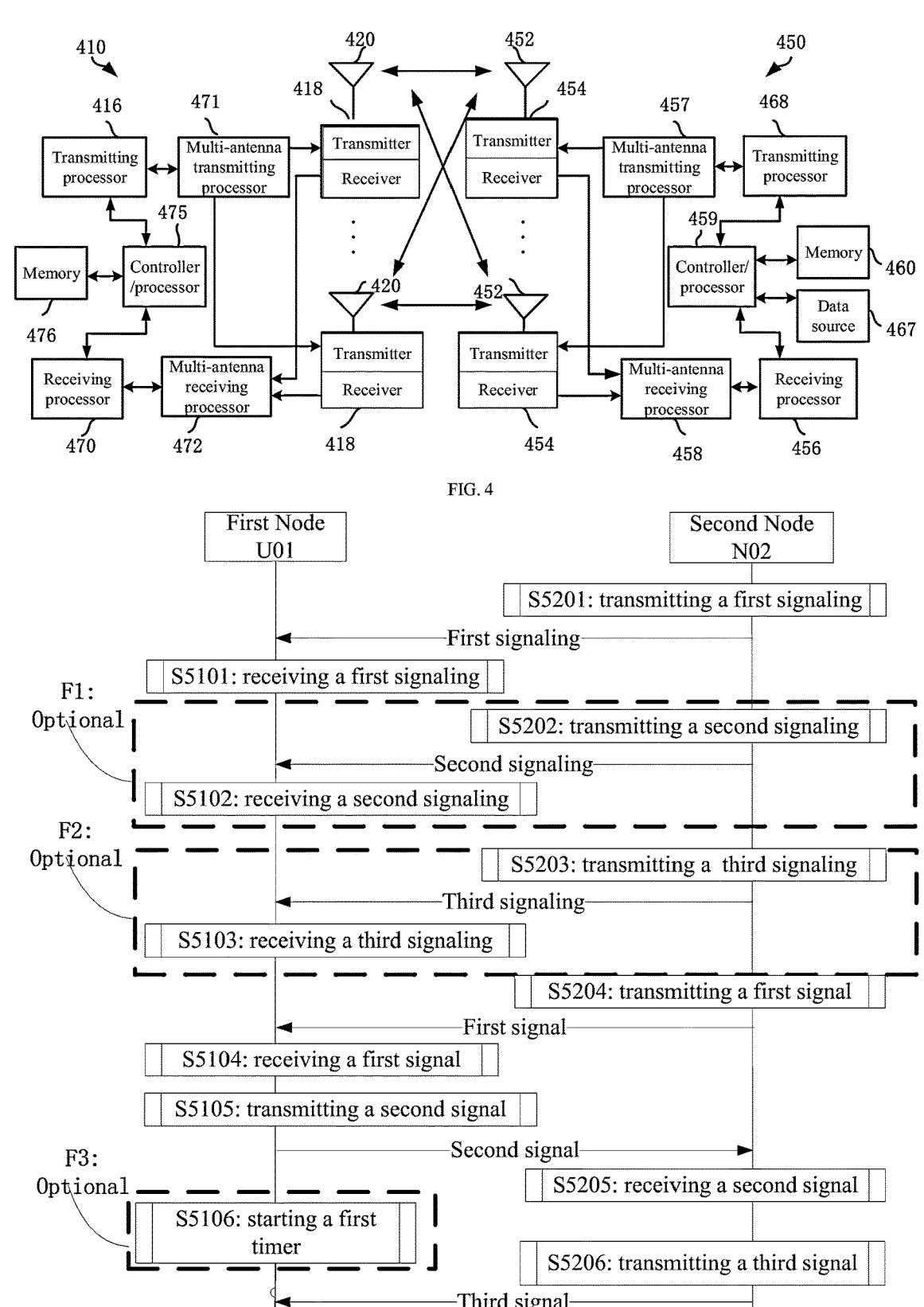
FIG. 4 is a diagram illustrating a first communication equipment and a second communication equipment according to one embodiment of the disclosure.
FIG. 5 is a flowchart of transmission of a radio signal according to one embodiment of the disclosure.

Embodiment 4 illustrates a diagram of a first communication equipment and a second communication equipment according to the disclosure, as shown in FIG. 4. FIG. 4 is a block diagram of a first communication equipment 450 and a second communication equipment 410 that are in communication with each other in an access network.

The first communication equipment 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication equipment 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication equipment 410 to the first communication equipment 450, at the second communication equipment 410, a higher-layer packet from a core network is provided to the controller/processor 475. The controller/processor 475 provides functions of Layer 2. In the transmission from the second communication equipment 410 to the first communication equipment 450, the controller/processor 475 provides header compression, encryption, packet segmentation and reordering, multiplexing between a logical channel and a transport channel, and a radio resource allocation for the first communication equipment 450 based on various priority metrics. The controller/processor 475 is also in charge of retransmission of lost packets, and signalings to the first communication equipment 450. The transmitting processor 416 and the multi-antenna transmitting processor 471 perform various signal processing functions used for Layer 1 (that is, PHY). The transmitting processor 416 performs encoding and interleaving so as to ensure FEC (Forward Error Correction) at the second communication equipment 410 and mappings to signal clusters corresponding to different modulation schemes (i.e., BPSK, QPSK, M-PSK M-QAM, etc.). The multi-antenna transmitting processor 471 processes the encoded and modulated symbols with digital spatial precoding (including precoding based on codebook and precoding based on non-codebook) and beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams with transmitting analog precoding/beamforming. Each transmitter 418 converts a baseband multicarrier symbol stream provided by the multi-antenna transmitting processor 471 into a radio frequency stream and then provides it to different antennas 420.

In a transmission from the second communication equipment 410 to the first communication equipment 450, at the first communication equipment 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of Layer 1. The multi-antenna receiving processor 458 processes the baseband multicarrier symbol stream coming from the receiver 454 with receiving analog precoding/beamforming. The receiving processor 458 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the second communication equipment 410. Next, the higher-layer data and control signal are provided to the controller/processor 459. The controller/processor 459 performs functions of Layer 2. The controller/processor 459 may be connected to the memory 460 that stores program codes and data. The memory 460 may be called a computer readable media. In the transmission from the second communication equipment 410 to the first communication equipment 450, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above Layer 2, or various control signals can be provided to Layer 3 for processing.

In a transmission from the first communication equipment 450 to the second communication equipment 410, at the first communication equipment 450, the data source 467 provides a higher-layer packet to the controller/processor 459. The data source 467 illustrates all protocol layers above the L2 layer. Similar as the transmitting function of the second communication equipment 410 described in the transmission from the second communication equipment 410 to the first communication equipment 450, the controller/processor 459 provides header compression, encryption, packet segmentation and reordering, and multiplexing between a logical channel and a transport channel based on radio resource allocation so as to provide the functions of L2 layer used for the control plane and user plane. The controller/processor 459 is also in charge of retransmission of lost packets, and signalings to the second communication equipment 410. The transmitting processor 468 conducts modulation mapping and channel encoding processing; the multi-antenna transmitting processor 457 performs digital multi-antenna spatial precoding (including precoding based on codebook and precoding based on non-codebook) and beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In a transmission from the first communication equipment 450 to the second communication equipment 410, the function of the second communication equipment 410 is similar as the receiving function of the first communication equipment 450 described in the transmission from second communication equipment 410 to the first communication equipment 450. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of Layer 1. The controller/processor 475 provides functions of Layer 2. The controller/processor 475 may be connected to the memory 476 that stores program codes and data. The memory 476 may be called a computer readable media. In the transmission from the first communication equipment 450 to the second communication equipment 410, the controller/processor 475 provides de-multiplexing between the transport channel and the logical channel, packet reassembling, decryption, header decompression, and control signal processing so as to recover higher-layer packets coming from the UE 450. The higher-layer packet, coming from the controller/processor 475, may be provided to the core network.

In one embodiment, the first communication equipment 450 includes at least one processor and at least one memory. The at least one memory includes computer program codes. The at least one memory and the computer program codes are configured to be used in collaboration with the at least one processor. The first communication equipment 450 at least receives a first signaling and a first signal, and transmits a second signal; wherein the first signaling is used for determining a first offset; the first signal is used for determining a first measurement result; the second signal includes N second sub-signal(s), a first sequence is used for determining the N second sub-signal(s); the first measurement result and the first offset are both used for determining the N; the N is a positive integer, and the second signal is used for initiating a random access.

In one embodiment, the first communication equipment 450 includes a memory that stores a computer readable instruction program. The computer readable instruction program generates an action when executed by at least one processor. The action includes: receiving a first signaling and a first signal, and transmitting a second signal; wherein the first signaling is used for determining a first offset; the first signal is used for determining a first measurement result; the second signal includes N second sub-signal(s), a first sequence is used for determining the N second sub-signal(s); the first measurement result and the first offset are both used for determining the N; the N is a positive integer, and the second signal is used for initiating a random access.

In one embodiment, the second communication equipment 410 includes at least one processor and at least one memory. The at least one memory includes computer program codes. The at least one memory and the computer program codes are configured to be used in collaboration with the at least one processor. The second communication equipment 410 at least transmits a first signaling and a first signal, and receives a second signal; wherein the first signaling is used for determining a first offset; the first signal is used for determining a first measurement result; the second signal includes N second sub-signal(s), a first sequence is used for determining the N second sub-signal(s); the first measurement result and the first offset are both used for determining the N; the N is a positive integer, and the second signal is used for initiating a random access.

In one embodiment, the second communication equipment 410 includes a memory that stores a computer readable instruction program. The computer readable instruction program generates an action when executed by at least one processor. The action includes: transmitting a first signaling and a first signal, and receiving a second signal; wherein the first signaling is used for determining a first offset; the first signal is used for determining a first measurement result; the second signal includes N second sub-signal(s), a first sequence is used for determining the N second sub-signal(s); the first measurement result and the first offset are both used for determining the N; the N is a positive integer, and the second signal is used for initiating a random access.

In one embodiment, the antenna 452, the receiver 454, the receiving processor 456 or the controller/processor 459 are used for receiving a first signaling and a first signal; and at least one of the antenna 420, the transmitter 418, the transmitting processor 416 or the controller/processor 475 is used for transmitting a first signaling and a first signal.

In one embodiment, the antenna 452, the receiver 454, the receiving processor 456 or the controller/processor 459 are used for receiving a second signaling; and at least one of the antenna 420, the transmitter 418, the transmitting processor 416 or the controller/processor 475 is used for transmitting a second signaling.

In one embodiment, the antenna 452, the transmitter 454, the transmitting processor 468 or the controller/processor 459 are used for transmitting a second signal; and at least one of the antenna 420, the receiver 418, the receiving processor 470 or the controller/processor 459 is used for receiving a second signal.

In one embodiment, the first communication equipment 450 corresponds to the first node in the disclosure.

In one embodiment, the second communication equipment 410 corresponds to the second node in the disclosure.

In one embodiment, the first communication equipment 450 is one UE.

In one embodiment, the first communication equipment 450 is one UE supporting large latency.

In one embodiment, the first communication equipment 450 is one UE supporting NTN.

In one embodiment, the first communication equipment 450 is one aircraft device.

In one embodiment, the first communication equipment 450 has a positioning capability.

In one embodiment, the first communication equipment 450 does not have a positioning capability.

In one embodiment, the first communication equipment 450 is one UE supporting TN.

In one embodiment, the second communication equipment 410 is one base station (gNB/eNB/ng-eNB).

In one embodiment, the second communication equipment 410 is one base station supporting large latency.

In one embodiment, the second communication equipment 410 is one base station supporting NTN.

In one embodiment, the second communication equipment 410 is one satellite device.

In one embodiment, the second communication equipment 410 is one flight platform device.

In one embodiment, the second communication equipment 410 is one base station supporting TN.

Embodiment 5

Embodiment 5 illustrates a flowchart of transmission of a radio signal according to one embodiment of the disclosure, as shown in FIG. 5. A second node N02 is a target base station of a first node U01; a third node N03 is a source base station of the first node U01; in particular, the order in this example does not limit the order of transmission and implementation of the signal in the disclosure.

The first node U01 receives a first signaling in S5101, receives a second signaling in S5102, receives a third signaling in S5103, receives a first signal in S5104, transmits a second signal in S5105, starts a first timer in S5106, and receives a third signal in S5107.

The second node N02 transmits a first signaling in S5201, transmits a second signaling in S5202, transmits a third signaling in S5203, transmits a first signal in S5204, receives a second signal in S5205, and transmits a third signal in S5206.

In Embodiment 5, the first signaling is used for determining a first offset; the first signal is used for determining a first measurement result; the second signal includes N second sub-signal(s), a first sequence is used for determining the N second sub-signal(s); the first measurement result and the first offset are both used for determining the N; the N is a positive integer, and the second signal is used for initiating a random access; the first measurement result and the first offset are used for determining a first level, and the first level is associated to the N; the second signaling includes a first time-frequency resource set; the first measurement result and the first offset are used for selecting a first time-frequency resource from the first time-frequency resource set; and the second signal is associated to the first time-frequency resource; the third signaling is used for determining M first-type offsets; the first offset is one of the M first-type offsets; a first parameter is used for selecting the first offset from the M first-type offsets; and the first parameter is related to a parameter of the second node N02; the first timer is used for determining a first time window; the first node U01 does not monitor a candidate signaling in the first time window; the first time is used for determining a start of the first time window; the first time is related to a transmitting time of the second signal; a parameter of the second node N02 is used for determining a length of the first time window; a start of the second time window is an end of the first time window; and a length of the second time window is related to the N.

In one embodiment, the first signaling includes one or more IEs of an SIB message.

In one embodiment, the first signaling includes one or more fields of an SIB message.

In one embodiment, the first signaling includes an rsrp-ThresholdsPrachInfoList.

In one embodiment, the first signaling includes partial or all fields of an PRACH-ConfigSIB IE.

In one embodiment, the first signaling includes one or more fields of a PRACH-Config IE.

In one embodiment, the first signaling includes one or more fields of a RACH-ConfigCommon IE.

In one embodiment, the first signal includes one Reference Signal (RS).

In one embodiment, the first signal includes a cell-specific reference signal (CRS).

In one embodiment, the second signal includes N repetitions of the first sequence.

In one embodiment, the second signal includes the N second sub-signals.

In one embodiment, the second signal includes a preamble sequence.

In one embodiment, the second signal includes a payload.

In one embodiment, the second signal is transmitted on a PRACH.

In one embodiment, the second signal is transmitted on a Physical Uplink Shared Channel (PUSCH).

In one embodiment, the first level is related to a signal quality received by the first node U01.

In one embodiment, the first level is related to an RSRP received by the first node U01.

In one embodiment, the first level is related to a pathloss.

In one embodiment, the first level is related to a transmission delay.

In one embodiment, the first level is related to a coverage of a base station.

In one embodiment, the first level includes a CEL.

In one embodiment, the phrase that the first level is associated to the N includes the following meaning: the first level is used for determining the N.

In one embodiment, the phrase that the first level is associated to the N includes the following meaning: the first level is used for determining a number of repetitions of the first sequence.

In one embodiment, the phrase that the first level is associated to the N includes the following meaning: the first node U01 determines the N according to the first level.

In one embodiment, the second signaling is transmitted through an air interface.

In one embodiment, the second signaling is transmitted through a radio interface.

In one embodiment, the second signaling is transmitted through a higher layer signaling.

In one embodiment, the second signaling includes partial or an entirety of a higher layer signaling.

In one embodiment, the second signaling includes one Radio Resource Control (RRC) message.

In one embodiment, the second signaling includes partial or all Information Elements (IEs) in one RRC signaling.

In one embodiment, the second signaling includes partial or all fields in one IE in one RRC signaling.

In one embodiment, the second signaling includes one broadcast message.

In one embodiment, the second signaling includes one SIB message.

In one embodiment, the second signaling is transmitted through a PBCH.

In one embodiment, the second signaling includes a PRACH-ConfigSIB.

In one embodiment, the second signaling includes a PRACH-Config.

In one embodiment, the second signaling includes an rsrp-ThresholdsPrachInfoList.

In one embodiment, the first time-frequency resource includes time, frequency and preamble.

In one embodiment, the first time-frequency resource includes time-domain resources and frequency domain resources.

In one embodiment, the first time-frequency resource includes time-domain resources.

In one embodiment, the first time-frequency resource includes frequency-domain resources.

In one embodiment, the first time-frequency resource includes preamble resources.

In one embodiment, the first time-frequency resource is used for transmitting the second signal.

In one embodiment, the first time-frequency resource is associated to the N.

In one embodiment, the first time-frequency resource is associated to a number of repetitions of the first sequence.

In one embodiment, the first time-frequency resource set includes K2 time-frequency resource(s), and the K2 is a positive integer.

In one subembodiment, the K2 time-frequency resources are orthogonal.

In one subembodiment, the K2 time-frequency resources are not orthogonal.

In one embodiment, any one time-frequency resource in the first time-frequency resource set is associated to a number of repetitions of the first sequence.

In one embodiment, the first time-frequency resource is associated to one Transmission Block Size (TBS).

In one embodiment, any one time-frequency resource in the first time-frequency resource set is associated to one CEL.

In one embodiment, the phrase that the second signal is associated to the first time-frequency resource includes the following meaning: the second signal is transmitted in the first time-frequency resource.

In one embodiment, the phrase that the second signal is associated to the first time-frequency resource includes the following meaning: the second signal is transmitted through the first time-frequency resource.

In one embodiment, the first offset is transmitted through an SIB broadcast.

In one embodiment, the first offset is configured through a PRACH-Config.

In one embodiment, the first offset is configured through a PRACH-ConfigSIB.

In one embodiment, the first offset is configured through a RACH-ConfigCommon.

In one embodiment, the first offset is used for adding one offset in the rsrp-ThresholdsPrachInfoList parameter.

In one embodiment, the phrase that the first measurement result and the first offset are used for selecting the first time-frequency resource from the first time-frequency resource set includes the following meaning: the first measurement result and the first offset are used for determining the first level, and the first level is used for selecting the first time-frequency resource from the first time-frequency resource set.

In one embodiment, the phrase that the first measurement result and the first offset are used for selecting the first time-frequency resource from the first time-frequency resource set includes the following meaning: the first measurement result and the first offset are used for determining the first level, and the first level is associated to the first time-frequency resource In one embodiment, the third signaling is transmitted through an air interface.

In one embodiment, the third signaling is transmitted through a radio interface.

In one embodiment, the third signaling is transmitted through a higher layer signaling.

In one embodiment, the third signaling includes partial or an entirety of a higher layer signaling.

In one embodiment, the third signaling includes one Radio Resource Control (RRC) message.

In one embodiment, the third signaling includes partial or all Information Elements (IEs) in one RRC signaling.

In one embodiment, the third signaling includes partial or all fields in one IE in one RRC signaling.

In one embodiment, the third signaling includes a broadcast signaling.

In one embodiment, the third signaling is transmitted through a PBCH.

In one embodiment, the third signaling includes an SIB message.

In one embodiment, the third signaling includes one or more IEs in an SIB message.

In one embodiment, the third signaling includes one or more fields in an SIB message.

In one embodiment, the third signaling includes one or more fields in a PRACH-ConfigSIB IE.

In one embodiment, the third signaling includes one or more fields in a PRACH-Config IE.

In one embodiment, the third signaling includes a rach-CE-LevelInfoList in TS36 protocols.

In one embodiment, the third signaling includes a prach-ParametersListCE in TS36 protocols.

In one embodiment, the third signaling includes an initial-CE-level in TS36 protocols.

In one embodiment, the phrase that a first parameter is used for selecting the first offset from the M first-type offsets includes the following meaning: determining a sequence number of the first parameter in M first-type parameters according to the first parameter of the first node U01, and then determining the first offset in the M first-type offsets according to a mapping relationship between the M first-type offsets and the M first-type parameters.

In one embodiment, any two of the M first-type offsets are different.

In one embodiment, any one of the M first-type offsets is one positive integer.

In one embodiment, the first timer is used for determining a time length of the first time window.

In one embodiment, the first timer is used for determining a time length during which the first node U01 performs an inactive state.

In one embodiment, the phrase that the first node U01 does not monitor a candidate signaling in the first time window refers that the first node U01 does not monitor a PDCCH during the running period of the first timer.

In one embodiment, the phrase that the first time is related to a transmitting time of the second signal refers that the second signal is transmitted at the first time.

In one embodiment, the phrase that the first time is used for determining a start of the first time window refers that the first timer is started at the transmitting time of the second signal.

In one embodiment, the phrase that a parameter of the second node N02 is used for determining a length of the first time window refers that the length of the first time window is related to a transmission latency between the second node N02 and the first node U01.

In one embodiment, the second time window refers to a Random Access Response Window (ra-ResponseWindow).

In one embodiment, the phrase that a length of the second time window is related to the N refers that the length of the second time window is in direct proportion to the N.

In one embodiment, the phrase that a start of the second time window is an end of the first time window includes the following meaning: the second time window starts once the first timer expires.

In one embodiment, the phrase that a length of the second time window is related to the N includes the following meanings: the bigger the number of repetitions of the first sequence in the second signal, the greater the length of the second time window.

In one embodiment, the first node U01 is one NB-IoT UE.

In one embodiment, the first node U01 is one Enhanced Machine-Type Communication (eMTC) UE.

In one embodiment, the first node U01 is one IoT UE.

In one embodiment, the first node U01 is one UE supporting large-latency transmission.

In one embodiment, the second node N02 is one NTN base station.

In one subembodiment, the NTN base station includes airborne vehicles.

In one subembodiment, the NTN base station includes High Altitude Platforms (HAPs).

In one subembodiment, the NTN base station includes Unmanned Aircraft Systems (UAS).

In one subembodiment, the NTN base station includes Lighter than Air (LTA) UAS.

In one subembodiment, the NTN base station includes Heavier than Air (HTA) UAS.

In one subembodiment, the NTN base station includes Spaceborne vehicles.

In one subembodiment, the NTN base station includes Low Earth Orbiting (LEO) satellites.

In one subembodiment, the NTN base station includes Medium Earth Orbiting (MEO) satellites.

In one subembodiment, the NTN base station includes Highly Elliptical Orbiting (HEO) satellites.

In one subembodiment, the NTN base station includes Geostationary Earth Orbiting (GEO) satellites.

In one embodiment, the second node is one TN base station.

In one subembodiment, the TN base station is one macro cellular base station.

In one subembodiment, the TN base station is one micro cell base station.

In one subembodiment, the TN base station is one pico cell base station.

In one subembodiment, the TN base station is one femto.

In one embodiment, the dash-line box F1 exists.

In one embodiment, the dash-line box F1 does not exist.

In one embodiment, the dash-line box F2 exists.

In one embodiment, the dash-line box F2 does not exist.

In one embodiment, the dash-line box F3 exists.

In one embodiment, the dash-line box F3 does not exist.

Embodiment 6

Embodiment 6 illustrates a flowchart of a first node determining a number of repetitions of the second signal and transmission resources according to one embodiment of the disclosure. In FIG. 6, each box represents one step, in particular, it should be noted that the order of the boxes does not represent a time precedence of the steps represented by the boxes.

In Embodiment 6, the first node in the disclosure determines a first measurement result and a first offset in S6101, determines a first level according to the first measurement result and the first offset in S6102, determines N and a first time-frequency resource according to the first level in S6103, and transmits a second signal in the first time-frequency resource in S6104.

In one embodiment, the first node determines the first measurement result according to the first signal.

In one subembodiment, the first signal is a reference signal transmitted by a base station.

In one subembodiment, the first node performs a measurement on the first signal to obtain the first measurement result.

In one embodiment, the first node determines the first offset according to the first signaling.

In one subembodiment, the first signaling includes a specific numeric value of the first offset.

In one subembodiment, the first signaling includes a type of a base station.

In one subembodiment, the first signaling includes a height of a base station.

In one subembodiment, the first signaling includes an altitude of a base station.

In one subembodiment, the first signaling includes a transmission delay.

In one subembodiment, the first signaling includes a pathloss.

In one subembodiment, the first signaling includes an RTT.

In one subembodiment, the first signaling includes an elevation.

In one embodiment, the first node determines the first level according to the first measurement result and the first offset.

In one subembodiment, a summation of the first measurement result and the first offset is used for determining the first level.

In one subembodiment, the first measurement result is used for determining a second level, and a summation of the second level and the first offset is used for determining the first level.

In one embodiment, the first offset is one offset for a CEL.

In one embodiment, the first offset is one offset for the first measurement result.

In one embodiment, Embodiment 7 is used for determining the first level.

In one embodiment, Embodiment 8 is used for determining the first level.

In one embodiment, the N is related to the first level.

In one subembodiment, different numerical values of the N correspond to different first levels.

In one subembodiment, the N is adjusted according to the first level determined by the first node.

In one embodiment, the N is related to the first time-frequency resource.

In one subembodiment, different numerical values of the N correspond to different time-frequency resource positions.

In one subembodiment, different numerical values of the N correspond to different time-frequency resource block sizes.

In one subembodiment, different numerical values of the N correspond to different time-frequency resource positions and different time-frequency resource block sizes.

In one embodiment, the phrase that the second signal is transmitted in the first time-frequency resource includes the following meaning: the second signal is transmitted in the first time-frequency resource corresponding to the first level.

Embodiment 7

Embodiment 7 illustrates a scenario in which a first measurement result and a first offset are used for determining a first level according to one embodiment of the disclosure.

In Embodiment 7, a summation of the first measurement result and the first offset is used for determining the first level.

In one embodiment, the first offset is in unit of dBm.

In one embodiment, the first offset is related to a first time length; and the first time length is related to a distance between the first node and a transmitter of the first signal.

In one subembodiment, the bigger the time length, the greater that first offset.

In one subembodiment, the first time length is related to a pathloss.

In one subembodiment, the first time length is related to a transmission delay.

In one embodiment, the first signaling includes a first sub-signaling, the first sub-signaling includes a first threshold and a second threshold; the first threshold and the second threshold are used for determining a first level; and the first threshold is less than the second threshold.

In one subembodiment, the first sub-signaling is one RRC message.

In one subembodiment, the first sub-signaling is one or more IEs in an RRC message.

In one subembodiment, the first sub-signaling is one or more IEs in an RRC message.

In one subembodiment, the first sub-signaling includes a PRACH-Config in TS36 protocols.

In one subembodiment, the first sub-signaling includes an rsrp-ThresholdsPrachInfoList field in TS36 protocols.

In one subembodiment, a summation of the first measurement result and the first offset, when less than the first threshold, is used for determining the first level.

In one subembodiment, a summation of the first measurement result and the first offset, when greater than the first threshold but less than the second threshold, is used for determining the first level.

In one subembodiment, a summation of the first measurement result and the first offset, when greater than the second threshold, is used for determining the first level.

Embodiment 8

Embodiment 8 illustrates a scenario in which a first measurement result and a first offset are used for determining a first level according to another embodiment of the disclosure.

In Embodiment 8, the first measurement result is used for determining a second level, and a summation of the second level and the first offset is used for determining the first level.

In one embodiment, the first offset is one non-negative integer.

In one embodiment, the first offset is one positive integer.

In one embodiment, the first offset is related to a type of a transmitter of the first signal.

In one subembodiment, when the transmitter of the first signal is one TN base station, the first offset is equal to 0.

In one subembodiment, when the transmitter of the first signal is one NTN base station, the first offset is not equal to 0.

In one subembodiment, the higher the transmitter of the first signal, the greater the first offset.

In one subembodiment, values of the first offsets corresponding to LEO, GEO, MEO and HEO increase gradually.

In one embodiment, the first signaling includes a second sub-signaling, and the second sub-signaling includes a third threshold and a fourth threshold; the third threshold and the fourth threshold are used for determining a second level; and the third threshold is less than the fourth threshold.

In one subembodiment, the second sub-signaling is one RRC message.

In one subembodiment, the second sub-signaling is one or more IEs in an RRC message.

In one subembodiment, the second sub-signaling is one or more IEs in an RRC message.

In one subembodiment, the second sub-signaling includes a PRACH-Config in TS36 protocols.

In one subembodiment, the second sub-signaling includes an rsrp-ThresholdsPrachInfoList field in TS36 protocols.

In one subembodiment, the first measurement result, when less than the third threshold, is used for determining the second level.

In one subembodiment, the first measurement result, when greater than the third threshold but less than the fourth threshold, is used for determining the second level.

In one subembodiment, the first measurement result, when greater than the fourth threshold, is used for determining the second level.

Embodiment 9

Embodiment 9 illustrates a scenario in which M first-type offsets are associated to M first-type parameters according to one embodiment of the disclosure. In FIG. 9, a dash-line box on the left represents a set of the M first-type offsets; a dash-line box on the right represents a set of the M first-type parameters; a first offset corresponds to a first parameter, a second offset corresponds to a second parameter, and so on, an Mth offset corresponds to an Mth parameter.

In Embodiment 9, the M first-type offsets are associated to the M first-type parameters; the first offset is one of the M first-type offsets; the first parameter is one of the M first-type parameters; and the first parameter is used for selecting the first offset from the M first-type offsets.

In one embodiment, the first node determines which parameter the first parameter belongs to according specific parameter configurations of the M first-type parameters, and then determines the first offset in the M first-type offsets according to the corresponding relationship between the M first offsets and the M first-type parameters.

In one embodiment, the M first offsets and the M first-type parameters are in one-to-one correspondence.

In one embodiment, any one of the M first-type offsets is associated to one of the M first-type parameters.

In one embodiment, any one of the M first-type offsets is corresponding to one of the M first-type parameters.

In one embodiment, the third signaling includes the M first-type parameters.

In one embodiment, the third signaling includes a corresponding relationship between the M first-type offsets and the M first-type parameters.

In one embodiment, the phrase that the first parameter belongs to one of the M first-type parameters includes the following meaning: the first parameter is in the range of one parameter among the M first-type parameters.

In one embodiment, any one of the M first-type parameters corresponds to one type of a base station.

In one embodiment, any one of the M first-type parameters corresponds to one height range of a base station.

In one embodiment, any one of the M first-type parameters corresponds to one range of transmission delay.

In one embodiment, any one of the M first-type parameters corresponds to one range of pathloss.

Embodiment 10

Embodiment 10 illustrates a scenario in which a parameter of a second node is used for determining a first offset according to one embodiment of the disclosure, as shown in FIG. 10.

In Embodiment 10, the first offset is related to a parameter of the second node.

In one embodiment, the second node is one base station.

In one embodiment, the second node is base station to which the first node performs a random access.

In one embodiment, the second node is a transmitter of the first signal.

In one embodiment, a parameter of the second nod is used for determining the first offset.

In one embodiment, the phrase that the first offset is related to a parameter of the second node includes the following meaning: the first offset is related to a type of the second node.

In one embodiment, a parameter of the second nod includes a type of the second node.

In one subembodiment, the type of the second node includes an NTN base station.

In one affiliated embodiment of the above subembodiment, the NTN base station includes one of LEO, GEO, MEO and HEO.

In one affiliated embodiment of the above subembodiment, a first offset corresponding to the second node when it is an LEO is less than a first offset corresponding to the second node when it is a GEO.

In one affiliated embodiment of the above subembodiment, a first offset corresponding to the second node when it is an LEO is less than a first offset corresponding to the second node when it is an MEO.

In one affiliated embodiment of the above subembodiment, a first offset corresponding to the second node when it is an MEO is less than a first offset corresponding to the second node when it is an HEO.

In one subembodiment, a type of the second node includes a TN base station.

In one affiliated embodiment of the above subembodiment, when the second node is a TN base station, the first offset is equal to 0.

In one embodiment, a parameter of the second node includes a height of the second node.

In one subembodiment, the higher the height of the second node, the greater the first offset.

In one subembodiment, different height ranges of the second node correspond to different offsets.

Embodiment 11

Embodiment 11 illustrates a scenario in which a relationship between a first node and a second node is used for determining a first offset according to one embodiment of the disclosure, as shown in FIG. 11.

In Embodiment 11, the first offset is related to a relationship between the first node and the second node.

In one embodiment, the first node is one UE.

In one embodiment, the first node is a receiver of the first signal.

In one embodiment, the second node is one base station.

In one embodiment, the first node is a transmitter of the first signal.

In one embodiment, a relationship between the first node and the second node is used for determining the first offset.

In one embodiment, a relationship between the first node and the second node includes a distance between the first node and the second node.

In one subembodiment, the further the distance between the first node and the second node, the greater the first offset.

In one subembodiment, the distance between the first node and the second node, when less than a first distance threshold, is used for determining the first offset.

In one subembodiment, the distance between the first node and the second node, when greater than a first distance threshold but less than a second distance threshold, is used for determining the first offset.

In one subembodiment, the distance between the first node and the second node, when greater than a second distance threshold, is used for determining the first offset.

In one affiliated embodiment of the above subembodiment, the first distance threshold and the second distance threshold are configurable.

In one affiliated embodiment of the above subembodiment, the first distance threshold and the second distance threshold are preconfigured.

In one affiliated embodiment of the above subembodiment, the first distance threshold and the second distance threshold are of fixed sizes.

In one affiliated embodiment of the above subembodiment, the first distance threshold and the second distance threshold are in unit of meter (m).

In one affiliated embodiment of the above subembodiment, the first distance threshold and the second distance threshold are in unit of kilometer (km).

In one embodiment, a relationship between the first node and the second node includes a latency from the first node U01 to the second node.

In one subembodiment, the larger the latency from the first node to the second node, the greater than first offset.

In one subembodiment, the latency from the first node to the second node, when less than a first time threshold, is used for determining the first offset.

In one subembodiment, the latency from the first node to the second node, when greater than a first time threshold but less than a second time threshold, is used for determining the first offset.

In one subembodiment, the latency from the first node to the second node, when greater than a second time threshold, is used for determining the first offset.

In one affiliated embodiment of the above subembodiment, the first time threshold and the second time threshold are configurable.

In one affiliated embodiment of the above subembodiment, the first time threshold and the second time threshold are preconfigured.

In one affiliated embodiment of the above subembodiment, the first time threshold and the second time threshold are of fixed sizes.

In one affiliated embodiment of the above subembodiment, the first time threshold and the second time threshold are in unit of millisecond (ms).

In one affiliated embodiment of the above subembodiment, the first time threshold and the second time threshold are in unit of second (s).

Embodiment 12

Embodiment 12 illustrates a scenario in which a number of first transmission times is used for determining a first offset according to one embodiment of the disclosure, as shown in FIG. 12.

In Embodiment 12, the first offset is related to a number of first transmission times; a number of transmission times of the second signal is used for determining the number of first transmission times.

In one embodiment, K represents a number of first transmission times of the second signal, and the K is a nonnegative integer.

In one embodiment, an initial value of the K is equal to 0; the second signal is transmitted once, and the K increases by 1; and the K is reset to 0 after the first nodes fails to attempt a random access.

In one embodiment, the phrase that the first nodes fails to attempt a random access includes the following meaning: the number of times the first node transmits the second signal exceeds a maximum allowed value of a preamble. The K is less than the maximum allowed value of the preamble.

In one embodiment, the K is used for determining the first offset.

In one subembodiment, the bigger the value of K, the greater the first offset.

In one embodiment, the Nis related to the K; the bigger the K, the bigger the N.

In one embodiment, each time the second signal is transmitted, the number of first transmission times increases by 1.

In one embodiment, the number of first transmission times includes the number of attempts of the second signal in one random access process.

In one embodiment, the number of first transmission times includes the number of attempts of the N second sub-signals in one random access process.

In one embodiment, the number of first transmission times includes the number of attempts of the first sequence in one random access process.

In one embodiment, each time the N second sub-signals are transmitted, the K increases by 1.

In one embodiment, each time the N second sub-signals are transmitted, the K increases by N.

Embodiment 13

Embodiment 13 illustrates a diagram of a timing sequence relationship of a first timer according to one embodiment of the disclosure, as shown in FIG. 13. In FIG. 13, a first time, a second time, a third time and a fourth time are four times arranged in a chronological order, the first time is less than the second time, the second time is less than the third time, and the third time is less than the fourth time; a box filled with grids represents a first time window, a box filled with slashes represents a second time window, and a box filled with cross lines represents a third time window; the first time is a start of the first time window, and the second time is an end of the first time window; the third time is a start of the second time window, and the fourth time is an end of the second time window; the second time is a start of the third time window, and the third time is an end of the third time window.

In Embodiment 13, the first node starts a first timer at a first time, and receives a third signal in a second time window; the first timer is used for determining a first time window; the first node does not monitor a candidate signaling in the first time window; the first time is used for determining a start of the first time window; the first time is related to a transmitting time of the second signal; a parameter of the second node is used for determining a length of the first time window; a start of the second time window is an end of the first time window; and a length of the second time window is related to the N.

In one embodiment, the candidate signaling is one physical layer signaling.

In one embodiment, the candidate signaling is one control signaling.

In one embodiment, the candidate signaling includes Downlink Control Information (DCI).

In one embodiment, the candidate signaling is a PDCCH.

In one embodiment, the candidate signaling is transmitted through a PDCCH.

In one subembodiment, the PDCCH includes a Cell Radio Network Temporary Identifier (C-RNTI), a CS-RNTI, an INT-RNTI, an SFI-RNTI, an SP-CSI-RNTI, a TPC-PUCCH-RNTI, a TPC-PUSCH-RNTI and a TPC-SRS-RNTI of a MAC entity.

In one embodiment, the third signal is transmitted in the second time window, and the third signal is received in the third time window.

In one embodiment, the third signal is one higher layer signal.

In one embodiment, the third signal is one MAC layer signal.

In one embodiment, the third signal is used for performing a random access.

In one embodiment, the third signal is used for a second step of random access.

In one embodiment, the third signal is used for a message 2 (Msg2) of 4-Step RACH.

In one embodiment, the third signal is used for a message B (MsgB) of 2-Step RACH.

In one embodiment, the third signal is one Random Access Response (RAR).

In one embodiment, the first timer includes a time interval between the time the second signal is transmitted and the time the third signal is received.

In one embodiment, the first timer includes a time interval between the time the second signal is transmitted and the start of the second time window.

In one embodiment, once the first timer expires, the second time window is started.

In one embodiment, the first timer is used for performing a Discontinuous Reception (DRX) operation.

In one subembodiment, the DRX includes an active state and an inactive state.

In one subembodiment, when the first node is in an active state, the first node needs to keep monitoring the candidate signaling.

In one subembodiment, when the first node is in an inactive state, the first node does not need to monitor the candidate signaling.

In one subembodiment, the first timer is used for enabling the first node to start an inactive state.

In one embodiment, the start of the first time window is a start time of transmission of the first sub-signal of the N second sub-signals.

In one embodiment, the phrase that the first time is used for determining a start of the first time window includes the following meaning: the first time is a start of the first time window.

In one embodiment, the phrase that a parameter of the second node is used for determining a length of the first time window includes the following meaning: a length of the first time window is related to a parameter of the second node.

In one subembodiment, a length of the first time window is configured according to a type of the second node.

In one subembodiment, the first time window includes one offset.

In one subembodiment, a length of the first time window is the offsets of the start of the second time window.

In one subembodiment, a length of the first time window corresponding to a TN base station is less than a length of the first time window corresponding to an NTN base station.

In one subembodiment, a length of the first time window is configured according to a height of the second node.

In one subembodiment, the higher the height of the second node, the greater the length of the first time window.

In one embodiment, the second time window is used for receiving an RAR.

In one embodiment, the second time window is a ra-response window.

In one embodiment, the second time window is a receiving window of the third signal.

In one embodiment, the third signal is received at one time in the second time window.

In one embodiment, the phrase that a start of the second time window is an end of the first time window includes the following meaning: after the first time expires, the second time window is started.

In one embodiment, the phrase that a start of the second time window is an end of the first time window includes the following meaning: there is no time interval between the second time window and the first time window.

In one embodiment, the phrase that a start of the second time window is an end of the first time window includes the following meaning: the second time window and the first time window are continuous in time.

In one embodiment, the phrase that a start of the second time window is an end of the first time window includes the following meaning: there is a second time gap between the second time window and the first time window.

In one subembodiment, the second time gap is used for performing a measurement.

In one subembodiment, the second time gap includes one period of time.

In one subembodiment, the second time gap is in unit of ms.

In one subembodiment, the second time gap is in unit of s.

In one subembodiment, the second time gap is preconfigured.

In one subembodiment, the second time gap is configurable.

In one subembodiment, the second time gap is of a fixed size.

In one embodiment, the phrase that a length of the second time window is related to the N includes the following meaning: the greater the N, the greater the length of the second time window.

In one embodiment, the phrase that a length of the second time window is related to the N includes the following meaning: a length of the second time window is in direct proportion to the N.

In one embodiment, the third time window is a transmitting window of the third signal.

In one embodiment, the third signal is transmitted at one time in the third time window.

In one embodiment, the phrase that the first time is related to a transmitting time of the second signal includes the following meaning: when the second signal is transmitted, the first timer is started.

In one embodiment, the phrase that the first time is related to a transmitting time of the second signal includes the following meaning: the first time is the time at which the second signal is transmitted.

In one embodiment, the phrase that the first node does not monitor a candidate signaling in the first time window includes the following meaning: the first node is in an inactive state in the first time window.

In one embodiment, the phrase that the first node does not monitor a candidate signaling in the first time window includes the following meaning: during the running period of the first timer, the first node does not monitor the candidate signaling.

In one embodiment, after the first time expires, the first node begins to monitor the candidate signaling.

In one embodiment, the first node monitors the candidate signal in the second time window.

Embodiment 14

Embodiment 14 illustrates a structure block diagram of a processing device in a first node according to one embodiment of the disclosure, as shown in FIG. 14. In FIG. 14, the processing device 1400 in the first node includes a first receiver 1401 and a first transmitter 1402.

The first receiver 1401 receives a first signaling and a first signal.

The first transmitter 1402 transmits a second signal.

In Embodiment 14, the first signaling is used for determining a first offset; the first signal is used for determining a first measurement result; the second signal includes N second sub-signal(s), a first sequence is used for determining the N second sub-signal(s); the first measurement result and the first offset are both used for determining the N; the N is a positive integer, and the second signal is used for initiating a random access.

In one embodiment, the first measurement result and the first offset are used for determining a first level, and the first level is associated to the N.

In one embodiment, the first receiver 1401 receives a second signaling; wherein the second signaling includes a first time-frequency resource set; the first measurement result and the first offset are used for selecting a first time-frequency resource from the first time-frequency resource set; and the second signal is associated to the first time-frequency resource.

In one embodiment, the first receiver 1401 receives a third signaling; wherein the third signaling is used for determining M first-type offsets; the first offset is one of the M first-type offsets; a first parameter is used for selecting the first offset from the M first-type offsets; and the first parameter is related to a parameter of a transmitter of the first signal.

In one embodiment, the first offset is related to a parameter of the transmitter of the first signal.

In one embodiment, the first offset is related to a relationship between the first node and the transmitter of the first signal.

In one embodiment, the first offset is related to a number of first transmission times; a number of transmission times of the second signal is used for determining the number of first transmission times.

In one embodiment, the first receiver 1401 starts a first timer at a first time; the first receiver 1402 receives a third signal in a second time window; wherein the first timer is used for determining a first time window; the first node does not monitor a candidate signaling in the first time window; the first time is used for determining a start of the first time window; the first time is related to a transmitting time of the second signal; a parameter of the transmitter of the first signal is used for determining a length of the first time window; a start of the second time window is an end of the first time window; and a length of the second time window is related to the N.

In one embodiment, the first receiver 1401 includes the antenna 452, the receiver 454, the multiantenna receiving processor 458, the receiving processor 456, the controller/processor 459, the memory 460 and the data source 467 in FIG. 4 in the disclosure.

In one embodiment, the first receiver 1401 includes the antenna 452, the receiver 454, the multiantenna receiving processor 458 or the receiving processor 456 in FIG. 4 in the disclosure.

In one embodiment, the first receiver 1401 includes the antenna 452, the receiver 454 or the receiving processor 456 in FIG. 4 in the disclosure.

In one embodiment, the first transmitter 1402 includes the antenna 452, the transmitter 454, the multiantenna transmitting processor 457, the transmitting processor 468, the controller/processor 459, the memory 460 or the data source 467 in FIG. 4 in the disclosure.

In one embodiment, the first transmitter 1402 includes the antenna 452, the transmitter 454, the multiantenna transmitting processor 457 or the transmitting processor 468 in FIG. 4 in the disclosure.

In one embodiment, the first transmitter 1402 includes the antenna 452, the transmitter 454 or the transmitting processor 468 in FIG. 4 in the disclosure.

Embodiment 15

Embodiment 15 illustrates a structure block diagram of a processing device in a second node according to one embodiment of the disclosure, as shown in FIG. 15. In FIG. 15, the processing device 1500 in the second node includes a second transmitter 1501 and a second receiver 1502.

The second transmitter 1501 transmits a first signaling and a first signal.

The second receiver 1502 receives a second signal.

In Embodiment 15, the first signaling is used for determining a first offset; the first signal is used for determining a first measurement result; the second signal includes N second sub-signal(s), a first sequence is used for determining the N second sub-signal(s); the first measurement result and the first offset are both used for determining the N; the N is a positive integer, and the second signal is used for initiating a random access.

In one embodiment, the first measurement result and the first offset are used for determining a first level, and the first level is associated to the N.

In one embodiment, the second transmitter 1501 transmits a second signaling; wherein the second signaling includes a first time-frequency resource set; the first measurement result and the first offset are used for selecting a first time-frequency resource from the first time-frequency resource set; and the second signal is associated to the first time-frequency resource.

In one embodiment, the second transmitter 1501 transmits a third signaling; wherein the third signaling is used for determining M first-type offsets; the first offset is one of the M first-type offsets; a first parameter is used for selecting the first offset from the M first-type offsets; and the first parameter is related to a parameter of the second node.

In one embodiment, the first offset is related to a parameter of the second node.

In one embodiment, the first offset is related to a relationship between a receiver of the first signal and the second node.

In one embodiment, the first offset is related to a number of first transmission times; a number of transmission times of the second signal is used for determining the number of first transmission times.

In one embodiment, a first timer is started at a first time; the second transmitter 1501 transmits a third signal in a second time window; wherein the first timer is used for determining a first time window; the receiver of the first signal does not monitor a candidate signaling in the first time window; the first time is used for determining a start of the first time window; the first time is related to a transmitting time of the second signal; a parameter of the second node is used for determining a length of the first time window; a start of the second time window is an end of the first time window; and a length of the second time window is related to the N.

In one embodiment, the second transmitter 1501 includes the antenna 420, the transmitter 418, the multiantenna transmitting processor 471, the transmitting processor 416, the controller/processor 475 or the memory 476 in FIG. 4 in the disclosure.

In one embodiment, the second transmitter 1501 includes the antenna 420, the transmitter 418, the multiantenna transmitting processor 471 or the transmitting processor 416 in FIG. 4 in the disclosure.

In one embodiment, the second transmitter 1501 includes the antenna 420, the transmitter 418 or the transmitting processor 416 in FIG. 4 in the disclosure.

In one embodiment, the second receiver 1502 includes the antenna 420, the receiver 418, the multiantenna receiver processor 472, the receiving processor 470, the controller/processor 475 or the memory 476 in FIG. 4 in the disclosure.

In one embodiment, the second receiver 1502 includes the antenna 420, the receiver 418, the multiantenna receiver processor 472 or the receiving processor 470 in FIG. 4 in the disclosure.

In one embodiment, the second receiver 1502 includes the antenna 420, the receiver 418 or the receiving processor 470 in FIG. 4 in the disclosure.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the disclosure include but not limited to unmanned aerial vehicles, communication modules on unmanned aerial vehicles, telecontrolled aircrafts, aircrafts, diminutive airplanes, mobile phones, tablet computers, laptops, vehicle-mounted communication equipment, wireless sensor, network cards, terminals for Internet of Things, REID terminals, NB-IoT terminals, Machine Type Communication (MTC) terminals, enhanced MTC (eMTC) terminals, data cards, low-cost mobile phones, low-cost tablet computers, and other radio communication equipment. The base station or system equipment in the disclosure includes but not limited to macro-cellular base stations, micro-cellular base stations, home base stations, relay base station, gNBs (NR nodes B), Transmitter Receiver Points (TRPs), and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A User Equipment (UE) for wireless communication, the UE comprising:

a receiver configured to:

receive information used to determine an offset for a Physical Random Access Channel (PRACH) transmission; and receive a reference signal; and a transmitter configured to transmit the PRACH transmission, wherein the PRACH transmission includes a preamble sequence transmitted N times, wherein N is an integer that is based on both the offset and a measurement of the reference signal;

wherein the receiver is further configured to begin to monitor for a candidate signal starting at a time that is based on a transmitting time of the PRACH transmission and ending at a time that is based on N.

2. The UE of claim 1, wherein the PRACH transmission initiates a random access procedure.

3. The UE of claim 1, wherein N is based on a summation of the measurement and the offset.

4. The UE of claim 1, wherein:

the receiver is further configured to receive a time-frequency resource set including a time-frequency resource; wherein the time-frequency resource is associated with N, is associated with the PRACH transmission, and is based on the measurement and the offset.

5. The UE of claim 1, wherein:

the receiver is further configured to receive a signaling that is used to determine a plurality of first-type offsets;

wherein:

any two of the plurality of first-type offsets are different; the offset is one of the plurality of first-type offsets; and a parameter, related to a base station that transmitted the reference signal, is used for selecting the offset from the plurality of first-type offsets.

6. The UE of claim 1, wherein the offset is related to a parameter of a transmitter of the reference signal.

7. The UE of claim 1, wherein the offset is related to a relationship between the UE and a base station that transmitted the reference signal.

8. The UE of claim 1, wherein each time the PRACH transmission is transmitted, a number of first transmission times increases by 1.

9. The UE of claim 1, wherein the UE does not monitor for the candidate signal in a time window; wherein a start of the time window is related to the transmitting time of the PRACH transmission; wherein a length of the time window is based on a parameter of a base station that transmitted the reference signal; and wherein the receiver is further configured to begin to monitor for the candidate signal at an end of the time window.

10. The UE of claim 1, wherein the offset is used to adjust a latency of communication between the UE and a base station.

11. A method performed by a User Equipment (UE), the method comprising:

receiving information used to determine an offset for a Physical Random Access Channel (PRACH) transmission;

receiving a reference signal;

transmitting the PRACH transmission, wherein the PRACH transmission includes a preamble sequence transmitted N times, wherein N is an integer that is based on both the offset and a measurement of the reference signal; and beginning to monitor for a candidate signal starting at a time that is based on a transmitting time of the PRACH transmission and ending at a time that is based on N.

12. The method of claim 11, wherein the PRACH transmission initiates a random access procedure.

13. The method of claim 12, wherein N is based on a summation of the measurement and the offset.

14. The method of claim 11, further comprising:

receiving a time-frequency resource set including a time-frequency resource; wherein the time-frequency resource is associated with N, is associated with the PRACH transmission, and is based on the measurement and the offset.

15. The method of claim 11, further comprising:

receiving a signaling that is used to determine a plurality of first-type offsets;

wherein:

any two of the plurality of first-type offsets are different; the offset is one of the plurality of first-type offsets; and a parameter, related to a base station that transmitted the reference signal, is used for selecting the offset from the plurality of first-type offsets.

16. The method of claim 11, wherein the offset is related to a parameter of a transmitter of the reference signal.

17. The method of claim 11, wherein the offset is related to a relationship between the UE and a base station that transmitted the reference signal.

18. The method of claim 11, wherein each time the PRACH transmission is transmitted, a number of first transmission times increases by 1.

19. The method of claim 11, wherein the UE does not monitor for the candidate signal in a time window; wherein a start of the time window is related to the transmitting time of the PRACH transmission; wherein a length of the time window is based on a parameter of a base station that transmitted the reference signal; and wherein the method further comprises beginning to monitor for the candidate signal at an end of the time window.

20. A base station for wireless communication, the base station comprising:

a transmitter configured to:

transmit information used to determine an offset for a Physical Random Access Channel (PRACH) transmission; and transmit a reference signal; and a receiver configured to receive the PRACH transmission, wherein the PRACH transmission includes a preamble sequence transmitted N times, wherein N is an integer that is based on both the offset and a measurement of the reference signal;

wherein the transmitter is further configured to transmit a candidate signal starting at a time that is based on a receiving time of the PRACH transmission and ending at a time that is based on N.

\* \* \* \* \*